United States Patent [19]
Romney et al.

[11] Patent Number: 5,872,848
[45] Date of Patent: Feb. 16, 1999

[54] METHOD AND APPARATUS FOR WITNESSED AUTHENTICATION OF ELECTRONIC DOCUMENTS

[75] Inventors: Gordon Romney, Salt Lake City; Pedro (Kepa) Zubeldia, Kaysville, both of Utah

[73] Assignee: Arcanvs, Kaysville, Utah

[21] Appl. No.: 800,560

[22] Filed: Feb. 18, 1997

[51] Int. Cl.[6] ................................................ H04L 9/00
[52] U.S. Cl. .............................. 380/25; 380/23; 380/49
[58] Field of Search ................................ 380/30, 25, 23, 380/21, 49

[56] References Cited

U.S. PATENT DOCUMENTS

| | | | |
|---|---|---|---|
| 5,157,726 | 10/1992 | Merkle et al. | 380/23 |
| 5,544,255 | 8/1996 | Smithies et al. | 380/23 X |
| 5,615,268 | 3/1997 | Bisbee et al. | 380/25 |

*Primary Examiner*—Bernarr E. Gregory
*Assistant Examiner*—Pinchus M. Laufer
*Attorney, Agent, or Firm*—Hecker & Harriman

[57] ABSTRACT

The present invention consists of a method and apparatus for authenticating an electronic document. In one embodiment of the invention, a party wishing to digitally sign an electronic document (the "client") stores the unsigned electronic document, and the client's public and private keys, on transportable storage media such as a floppy disk. The client conveys the storage media to an authorized electronic document authenticator. An authorized electronic document authenticator is an individual or enterprise that has access to the apparatus of the present invention or that has been authorized to use the method of the present invention. The client presents identity documents to the authenticator to verify the client's identity. The client digitally signs the electronic document in the presence of the authenticator. The authenticator verifies the digital signature using the public key provided by the client. Having witnessed the client digitally signing the electronic document using the client's private key, having verified that the public key supplied to the authenticator by the client corresponds to the private key used by the client to produce the digital signature, and having verified the identity of the client using the identification documents provided by the client and/or biometric measurements taken of the client, the authenticator appends an "authenticator identification envelope" containing a certification to that effect to the electronic document. In one embodiment of the invention, the authenticator identification envelope includes digitally recorded biometric data obtained from the client. The authenticator digitally signs the resulting electronic document, creating an authenticated electronic document. The authenticator transfers the completed, authenticated electronic document onto transportable storage media and returns it to the client.

20 Claims, 10 Drawing Sheets

FIG. 4

ASSIGNMENT                    ─400

I, J.Q. Public, hereby assign all my rights and interest to
the invention described in U.S. Patent Application Serial No. ─ 410
11/123,456 to Employer Company.

Signed,
J.Q. Public

FIG. 5                                        500

| Enter Pass Phrase |
|---|
| Digitally sign file: |
| a:\assgnmt.txt |
| Using private key for User ID: |
| J.Q. Public |
| Enter the pass phrase protecting this private key. |
| [          ] |
| [OK]   [Cancel] |

```
-------BEGIN PGP SIGNED MESSAGE------
ASSIGNMENT

I, J.Q. Public, hereby assign all my rights and interest to the
invention described in U.S. Patent Application Serial No.
11/123,456 to Employer Company.

Signed,
J.Q. Public

-------BEGIN PGP SIGNATURE-------
Version: 4.0 Business Edition iQCVAgUBMMZA1sq/mPn0kahLAQFNAwP/VgrV8dwiSRwqovx+iqlPp2iw87wItjFD
Uf8J044G+gs3wmCbJMxJ/gmJXzPmQJNo37T5HQ1aA0Ugile7GX2SiZB0HzSCcQ4C
AQbZU0cfNR132pSPccem1rMHu/Fy4j2YHEX8caXc3mLwRuP1VXtOntUpLL6xiQsT
11s/JpLNX34=
=16rS
-------END PGP SIGNATURE-------
```

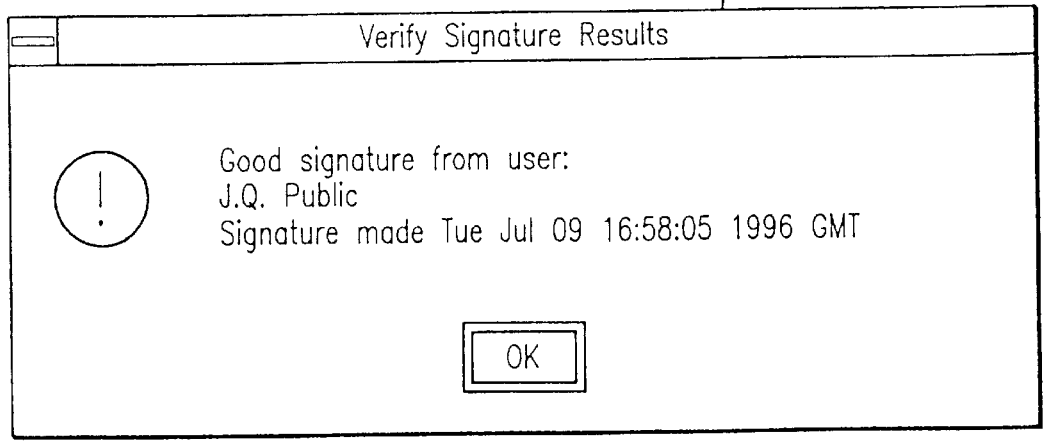

FIG. 9-1

```
-----BEGIN PGP SIGNED MESSAGE-----   965

-----BEGIN PGP SIGNED MESSAGE-----

ASSIGNMENT

I, J.Q. Public, hereby assign all my rights and interest to the invention
described in U.S. Patent Application Serial No. 11/123,456 to Employer
Company.

Signed,
J.Q. Public

-----BEGIN PGP SIGNATURE-----
Version: 4.0 Business Edition iQCVAgUBMMZA1sq/mPn0kahLAQFNAwP/VgrV8dwiSRwqovx+iq1Pp2iw87wItjFD
Uf8J044G+gs3wmCbJMxJ/gmJXzPmQJNo37T5HQ1aA0Ugile7GX2SiZBOHzSCcQ4C
AQbZU0cfNR132pSPccem1rMHu/Fy4j2YHEX8caXc3mLwRuP1VXtOntUpLL6xiQsT
11s/JpLNX34=
=I6rS
-----END PGP SIGNATURE-----
```

```
-----BEGIN AUTHENTICATOR IDENTIFICATION ENVELOPE----      915
-----BEGIN AUTHENTICATOR STATEMENT--    920

I, Paula A. Smith, personally witnessed the above digital signature of John Q.
Public at the following date, time and place:                            921

Date:    July 9, 1996
Time:    4:58 PM                922
Place:   Anyplace, U.S.A.

I verified the identity of John Q. Public by examining the following
documents:                                                     923

Drivers License No. 1122-334-445
U.S. Passport No. 998877665544

I obtained the following biometric data, which is appended hereto:     924

Retinal scan, left eye

Signed:         Paula A. Smith      930
    ------END AUTHENTICATOR STATEMENT---
```

-----BEGIN BIOMETRIC DATA----- ~935
010101000100101010100101101010100101001010010100001110101000
011010100101101001110100101010010101001010010100101100100111
010101111111101111001010101001100101010010101101010101001000
111010111110110010111111100011101110101001010010011101010101010
011100110110100110010100100010101010010010100110010101010101111
0101010110110001001001010101010101010001010100111101011111010100111011
0101100110010010010101010101010010001101010 ~940
-----END BIOMETRIC DATA----- ~945
-----END AUTHENTICATOR IDENTIFICATION ENVELOPE----- ~950

-----BEGIN PGP SIGNATURE----- ~961
Version: 4.0 Business Edition ~962 iQCVAgUBMeKbnsq/mPn0kahLAQE8kwP/e6fz2zcaX9WlutgA9a8g4efpNb7G0vIk ~963
a8tad/1CBNQ4GIvNDMac9fmMRMmgNYiKi+36vTyBRCWr82JWjvwgxCz4iOToGem0
eaGjHRHxF5WvY9bbfIofLLArieqfMUiXRHAel/IH3aQxsOxrxNUeGh3Kr3WFGhvs
77BmWD96m5A=
=8qqv
-----END PGP SIGNATURE----- ~964

METHOD AND APPARATUS FOR WITNESSED AUTHENTICATION OF ELECTRONIC DOCUMENTS

BACKGROUND OF THE INVENTION

1. Field of the Invention

The present invention relates to the field of electronic commerce, and more particularly to a method and apparatus for authenticating electronic documents.

2. Background Art

Well established mechanisms exist for creating legally binding written instruments. One such mechanism is the application of a handwritten signature to a written document. For certain transactions, authentication of a handwritten signature, for example by a licensed public official such as a notary, is required. Authentication of a signature by a notary requires a personal appearance before the notary. The notary personally witnesses the execution of the signature, inspects identity documents to verify the identity of the person executing the signature, and affixes a notary statement and seal to the signed document. Notarization of a signature provides a level of assurance that the written instrument was in fact executed by the person identified by the signature, and prevents repudiation of the signed instrument by the signer.

Electronic, computer based methods of doing business are increasingly displacing traditional paper based methods. Electronic communications and electronic documents are replacing written contracts, orders, payment instruments, account statements, invoices, and other paper documents.

Unlike their paper counterparts, electronic documents do not exist in physical form. Instead, they consist of sets of digital data that may be stored on various types of digital storage media ranging from volatile internal RAM memory to non-volatile ROM memory to magnetic and/or optical disk storage media, and that may be transmitted over various computer communications links including local and wide area networks, and the Internet. Because electronic documents do not have a physical form, the mechanisms devised to create legally binding paper instruments, such as affixing a notarized signature, cannot be used for electronic documents. Accordingly, a need has arisen for alternative mechanisms for creating and authenticating legally binding electronic documents and communications. Digital encryption, digital message digests, digital signatures, and digital certificates are some of the existing cryptographic tools that are used in the present invention to address this need.

Two well known types of cryptography are secret key cryptography and public key cryptography.

Secret key cryptography is a symmetric form of cryptography in which a single key is used to encrypt and decrypt an electronic document. To encrypt an electronic document, the electronic document and the secret key are supplied to a hardware device or a software encryption program that transforms the electronic document into an encrypted electronic document by means of an encryption process that uses the secret key and the electronic document as an input. The original electronic document can only be obtained from the encrypted electronic document by applying a reverse decryption process using the same secret key. Because the same secret key is used for encryption and decryption, both the sender and the recipient of the encrypted electronic document must have a copy of the secret key. The security of secret key cryptography can therefore be compromised by either the sender or the recipient.

Public key cryptography is an asymmetric form of cryptography that uses a two-key pair, typically referred to as a public key and a private key. These two keys are different but constitute a matched key pair. In public key encryption, electronic documents encrypted with either the public or private key of a public-private key pair can only be decrypted using the other key of the key pair. For example, an electronic document encrypted with a public key can only be decrypted using the corresponding private key. Conversely, an electronic document encrypted with a private key can only be decrypted using the corresponding public key.

The terms "public" key and "private" key stem from a manner in which public key cryptography is often used. A party A, concerned about privacy of its incoming communications generates a public-private key pair, using cryptographic hardware and/or software. Party A keeps its private key secret, but freely distributes its public key. Party B wishing to send a confidential electronic document to party A, can encrypt its electronic document using party A's freely available public key. Since the electronic document can then only be decrypted using the corresponding private key, party B can be assured that only party A, in possession of the private key, will be able to decode the encrypted electronic document.

A number of uncertainties arise with respect to the use of public key cryptography. One uncertainty relates to the identity of the owner of the private key that corresponds to the public key. It is possible, for example, that a public key may be circulated that fraudulently purports to be the public key of party A, but the corresponding private key of which is actually held by party C. A sender who encrypts a confidential communication to party A, using the public key the sender believes belongs to party A, will instead be creating a confidential communication that can be decrypted and read only by party C.

A second uncertainty, from the perspective of the recipient, relates to the identity of the sender of an encrypted communication. Since the recipient's public key is freely distributed, encryption of a communication with the recipient's correct public key does not provide any information concerning the sender, other than that the sender is someone who has access to the recipient's public key. As public keys are often freely available from public key repositories, the sender could be anyone.

A third uncertainty concerns the integrity of the communication—that is, there is an uncertainty as to whether the communication received by the recipient is the actual communication sent by the sender. For example, the communication may have been intercepted, modified, or replaced.

Digital signatures and digital certificates have been devised to address some of the uncertainties inherent in public key cryptography.

One of the purposes of a digital signature is to link an electronic document with an owner of the private key corresponding to a particular public key. Additionally, a digital signature can be used to determine whether an electronic document has been altered during transmission of the document from the sender to the recipient.

One form of digital signature uses a message digest. A message digest is a value that is generated when an electronic document is passed through a one way encryption process ("digesting process") such as a hashing routine. An ideal digesting process is one for which the probability that two different electronic documents will generate the same message digest is near zero. In this form of digital signature, both the sender and the recipient need to know which digesting process is being used. The sender generates the electronic document, and generates a message digest by passing the electronic document through the digesting process. The sender encrypts the resulting message digest with the sender's private key. The result, the encrypted message digest, then becomes the digital signature of the electronic document. The digital signature may be appended to the electronic document or kept as a separate entity.

The recipient obtains the electronic document and the digital signature of the sender. The recipient decrypts the digital signature using what the recipient believes to be the sender's public key, obtaining the decrypted message digest X. The recipient processes the received electronic document using the digesting process, obtaining message digest Y. The recipient then compares message digest Y to message digest X. If X=Y, the message digests are the same. This verifies that the electronic document was (1) digitally signed by the private key corresponding to the public key used to recover message digest X, and (2) that the electronic document content was not changed from the time that it was signed to the time that the digital signature was verified. However, the uncertainty remains as to whether the public key used by the recipient to decrypt the digital signature, which the recipient believes is the public key of the sender, is in fact the sender's public key.

The effectiveness of the digital signature, as well as other uses of public key cryptography, thus depends on the level of confidence as to the identity of the holder of the private key corresponding to a particular public key.

Digital certificates are intended to provide a level of assurance as to the identity of the holder of the private key corresponding to a particular public key. The issuers of digital certificates are called certification authorities. A digital certificate constitutes a certification by a certification authority that a particular public key is the public key of a particular entity, and that this entity is the holder of the corresponding private key.

Certification authorities are often commercial enterprises that collect fees for issuing digital certificates. To obtain a digital certificate, an applicant submits an application for a digital certificate together with the applicant's public key and some form of identity verification to a certification authority. The certification authority reviews the application, and if the application meets the criteria established by the certification authority, issues a digital certificate to the applicant.

The digital certificate itself is an electronic document. Although a variety of formats exist, a digital certificate typically includes, among other items, the name of the certification authority, the name of the certificate holder, the expiration date of the certificate, the public key of the certificate holder, and the digital signature of the certification authority. The digital certificate constitutes a certification by the certification authority that the holder of the certificate is the owner of the public key specified in the certificate, and, by implication, is therefore the holder of the corresponding private key.

The authenticity of a digital certificate is tested by verifying the certification authority's digital signature using the certification authority's public key. The level of assurance provided by a digital certificate depends on a number of factors, including the reputation of the certification authority issuing the certificate, the thoroughness of the procedures used by the certification authority in issuing the certificate, and the level of confidence in the certification authority's public key. Some certification authorities issue different levels of certificates, corresponding to different levels of investigation performed by the certificate authority during evaluation of an application.

The authenticity of a digital signature depends largely on the authenticity of the public key used by a recipient to test the digital signature. A digital certificate may be used to help authenticate a digital signature by verifying the authenticity of the certificate holder's public key. The digital certificate may be appended to an electronic document, or the recipient of an electronic document may obtain a copy of the certificate from the issuing certification authority or other certificate repository.

One drawback of using digital certificates for authentication of a digital signature is that a party wishing to digitally sign an electronic document must have previously applied for and obtained a digital certificate. If a party does not have a digital certificate its digital signature is questionable. A second drawback of prior art digital certificates is that certification authorities do not require an applicant to prove that the applicant has actual custody of the private key corresponding to the public key the applicant presents to the certification authority for certification at the time of application. Accordingly, the question remains as to the identity of the real holder of the private key corresponding to the public key identified in the digital certificate.

Accordingly, there remains a need for a means for verification of the authenticity of a digital signature in the absence of a digital certificate, and for verifying that a purported owner of a public key in fact has present custody of the corresponding private key at the time a digital signature is executed.

SUMMARY OF THE INVENTION

The present invention consists of a method and apparatus for authenticating an electronic document. In one embodiment of the invention, a party wishing to digitally sign an electronic document (the "client") generates the document using appropriate software, such as, for example, a word processing program or a spreadsheet. The client, if not already in possession of a public-private key pair, generates a public-private key pair using cryptographic hardware and/or software. The client conveys the unsigned electronic document, and the client's public and private keys, to an authorized electronic document authenticator on storage media such as a floppy disk or by other electronic means. An authorized electronic document authenticator is an individual or enterprise that has access to the apparatus of the present invention or that has been authorized to use the method of the present invention. The client presents identity documents to the authenticator to verify the client's identity. Such identity documents may include picture identification documents such as a driver's license and a passport, and other identification documents. Depending upon the degree of identity verification required, the authenticator may also take fingerprint or retinal scans or other biometric readings of the client.

The client digitally signs the electronic document in the presence of the authenticator. In one embodiment, in which the cryptographic software used by the client is compatible with the cryptographic software available on a computer system of the authenticator, the client places the storage media containing the electronic document to be signed, and the public and private keys of the client, into an appropriate storage media reading device of the authenticator's computer. The client, while being observed by the authenticator, then proceeds to digitally sign the electronic document by giving appropriate commands to the authenticator's computer, using the client's private key contained (in pass phrase protected form) on the client's storage media. The software in the authenticator's computer creates the client's digital signature of the electronic document by deriving a message digest of the electronic document and encrypting the message digest with the private key supplied by the client.

The authenticator verifies the digital signature using the public key provided by the client by giving appropriate commands to the authenticator's computer. The software in the authenticator's computer decrypts the digital signature using the client's public key obtaining message digest X. The authenticator software derives a second message digest Y for the electronic document, and compares message digest Y to message digest X. The two message digests X and Y will be identical only if the private key used by the client to create the digital signature and the public key used by the authenticator to decrypt the digital signature are a valid public-private key pair. The authenticator (1) verifies the identity of the client using the identification documents provided by the client and/or biometric measurements taken of the client; (2) witnesses the client digitally signing the electronic document using the client's private key; and (3) verifies that the public key supplied to the authenticator by the client corresponds to the private key used by the client to produce the digital signature. The authenticator then creates an "authenticator identification envelope" containing a certification of the above numerated steps. In one embodiment of the invention, the authenticator also includes digitally recorded biometric data of the client in the authenticator identification envelope. The authenticator digitally signs the authenticator identification envelope and the electronic document, creating an authenticated electronic document. In one embodiment the authenticator gives appropriate commands to the authenticator's computer to store the authenticated electronic document on the storage media supplied by the client, and returns the storage media containing the authenticated electronic document to the client.

In one embodiment, if the cryptographic software used by the client to produce its public-private key pair is not compatible with cryptographic software available on the authenticator's computer, the client brings with it to the authenticator either a copy of the cryptographic software used by the client, or a portable computer in which the cryptographic software used by the client has been installed.

In one embodiment of the invention, the authenticator assists the client in the application process for obtaining a digital certificate from a certification authority. A party wishing to apply for a digital certificate from the certification authority fills out an application for a digital certificate in an appropriate electronic form. The authenticator authenticates the digital certificate application in the same manner used to authenticate other electronic documents. In this embodiment, instead of returning the authenticated application to the applicant, the authenticator may convey the authenticated application in electronic form to the certification authority.

BRIEF DESCRIPTION OF THE DRAWINGS

FIG. 4 is an illustration of an example electronic document.

FIG. 5 illustrates a dialog box requesting entry of a client's pass phrase for one embodiment of the present invention.

FIG. 6 illustrates the electronic document of FIG. 4 after a digital signature of a client has been attached in one embodiment of the present invention.

FIG. 7 illustrates an example of a dialog box used to indicate a good digital signature in one embodiment of the present invention.

FIG. 9 illustrates the document of FIG. 6 after it has been authenticated according to one embodiment of the present invention.

DETAILED DESCRIPTION OF THE INVENTION

A method and apparatus for authentication of electronic documents is described. In the following description, numerous specific details are set forth in order to provide a thorough description of the present invention. It will be apparent, however, to one skilled in the art, that the present invention may be practiced without these specific details. In other instances, well-known features have not been described in detail so as not to obscure the present invention.

Figure 1:
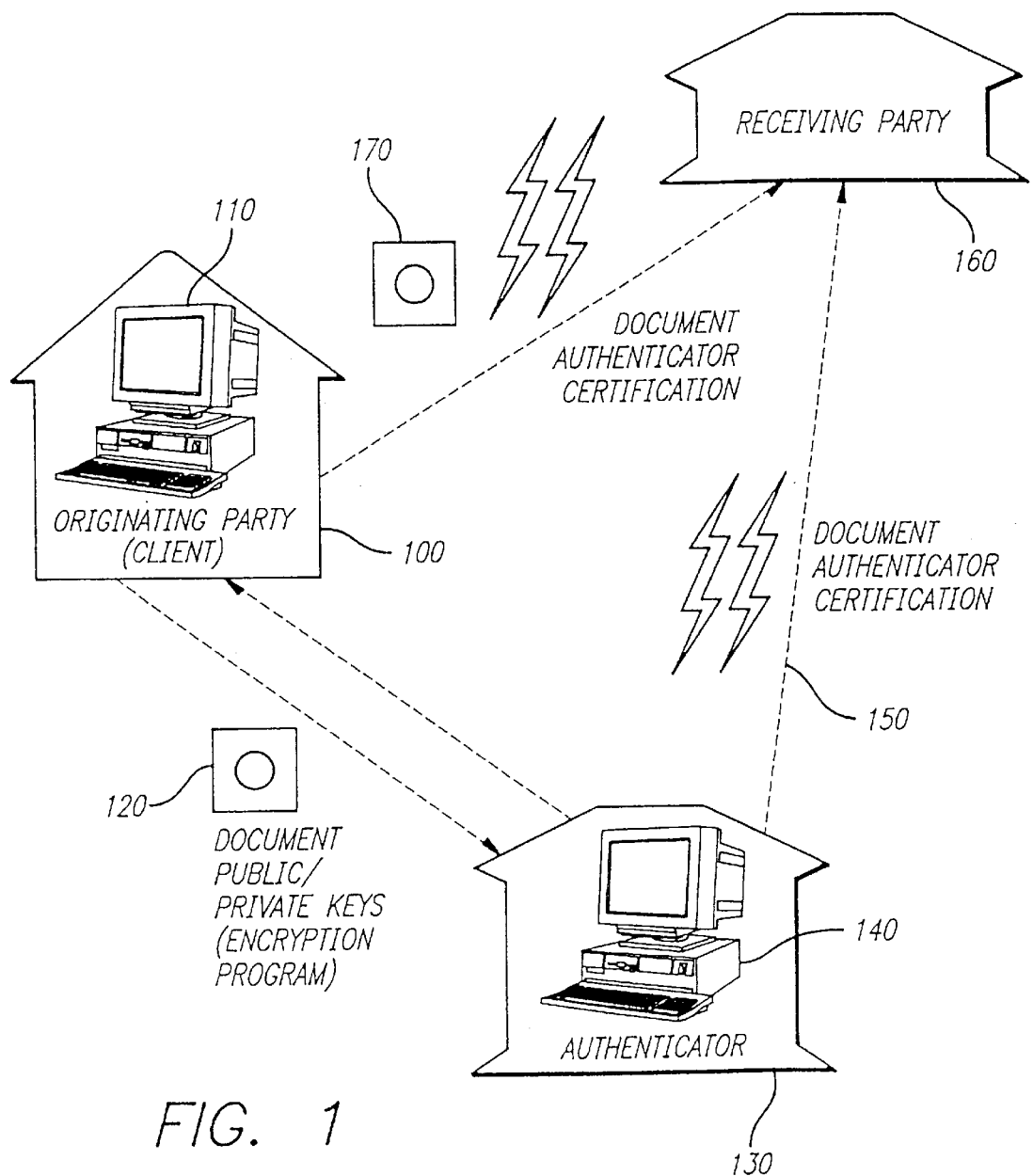
FIG. 1 is a schematic diagram of the topology of one embodiment of the present invention.

FIG. 1 is a schematic diagram of the topology of one embodiment of the present invention. As shown in FIG. 1, participants involved in this embodiment of the invention include an originating party or "client" 100 and an authenticator 130. Client 100 is the party that wishes to have its digital signature authenticated by authenticator 130. Authenticator 130 is an individual or enterprise that has access to the apparatus of the present invention or that has been authorized to use the method of the present invention. In the embodiment of FIG. 1, client 100 has a client computer 110, which may, for example, be a personal computer running Microsoft Windows 95™. Authenticator 130 has an authenticator computer 140, which may, for example, be a personal computer running Microsoft Windows 95. FIG. 160 also shows a receiving party 160. Receiving party 160 is an intended recipient of the electronic document to be signed by client 100.

Figure 2:
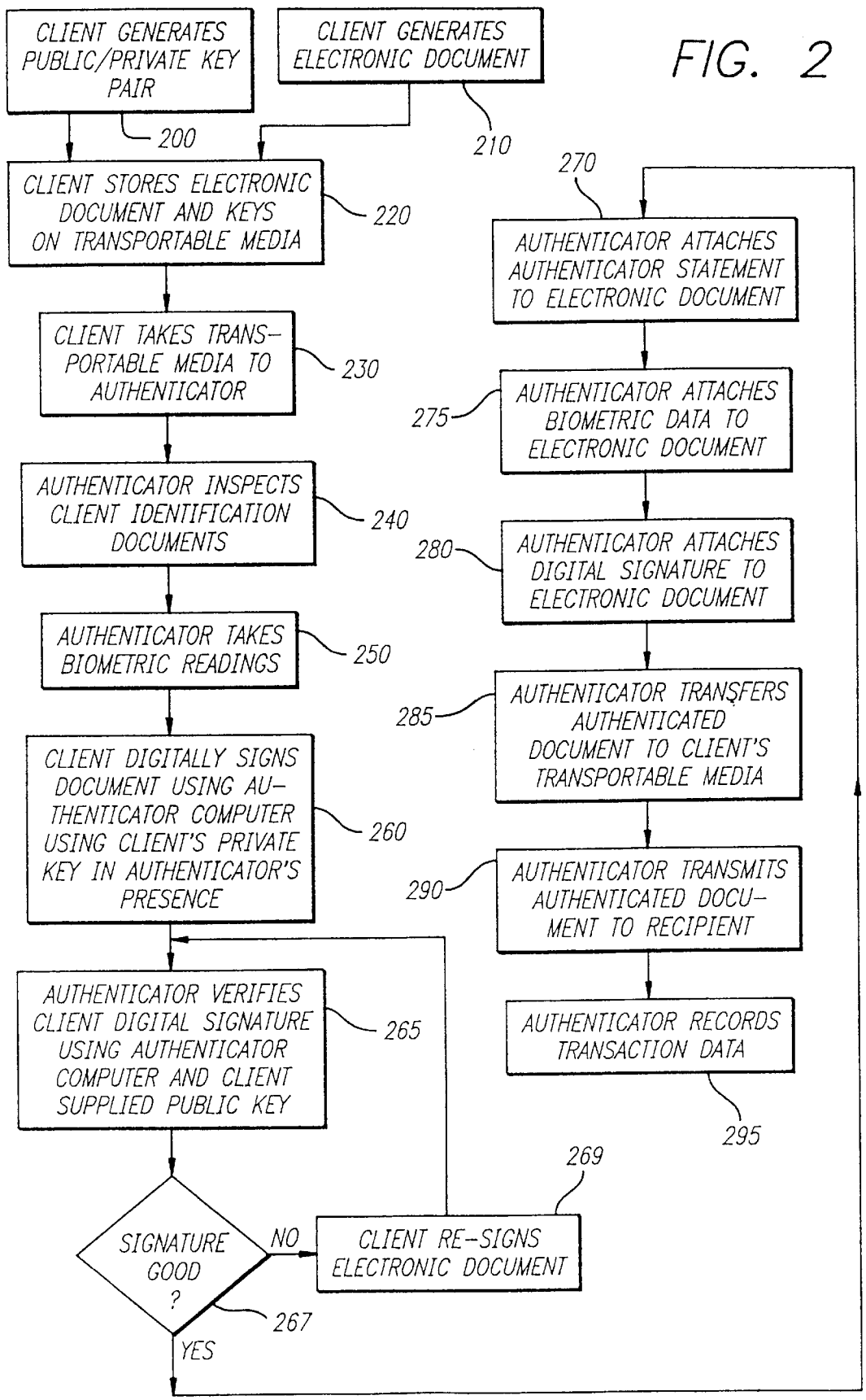
FIG. 2 is a block diagram of a process used to produce an authenticated electronic document in one embodiment of the present invention.

FIG. 2 is a block diagram of the process used to produce an authenticated electronic document in one embodiment of the present invention. In the embodiment of FIG. 2, the process begins with client 100 generating a public-private key pair at block 200. The client may, for example, generate such a public-private key pair using cryptographic software, such as for example ViaCrypt PGP™ from ViaCrypt, running on client computer 110. Alternatively, if the client already has a public-private key pair, the process may start at block 210, at which client 100 generates the electronic document to be digitally signed according to the present invention. The electronic document to be signed may be a text file, a word processing file, a graphics file, a data base file, a spreadsheet file, or any other file containing digital data. Client 100 may generate the electronic document at block 210 using appropriate software running on client computer 110. Alternatively, instead of generating the electronic document, client 100 may obtain the electronic document from another party, for example by downloading it from the Internet.

After generating or otherwise obtaining the electronic document to be signed at block 210, and editing the electronic document as necessary to place it in final form, client 100 stores the electronic document on transportable storage media such as floppy disk 120 shown in FIG. 1. Any other form of transportable storage media, including transportable hard disk drives (such as, for example, Jaz™ hard drives), magnetic tape cartridges, flash RAM cards, smart cards, chip cards, recordable CD-ROM's, or other transportable storage media may be used. Client 100 also copies the client's public and private keys to the same or another transportable storage media. Cryptographic programs such as ViaCrypt PGP™ do not allow a private key to be stored on storage media other than in encrypted form. Accordingly, the private key may be stored in encrypted form on the transportable media.

At block 230, client 100 conveys the transportable media on which the electronic document and the public and private keys have been stored to authenticator 130. Alternatively, instead of storing the electronic document and/or the client's public and private keys on transportable media and physically conveying the transportable media to authenticator 130, client 100 may transmit one or more of the electronic document and the public/private keys to authenticator 130 by electronic means, using, for example, a telephone line and a modem.

At block 240, authenticator 130 inspects identification documents provided by client 100 to verify the client's identity. Such documents may include photo identification documents such as passports and drivers licenses, as well as other identification documents. In addition, or as an alternative, the authenticator may take biometric readings of client 100 at block 250. For example, the authenticator may digitally record the client's fingerprints, may take a digital voice print of the client, may take a retinal scan, or take some other form of biometric reading.

Figure 3:
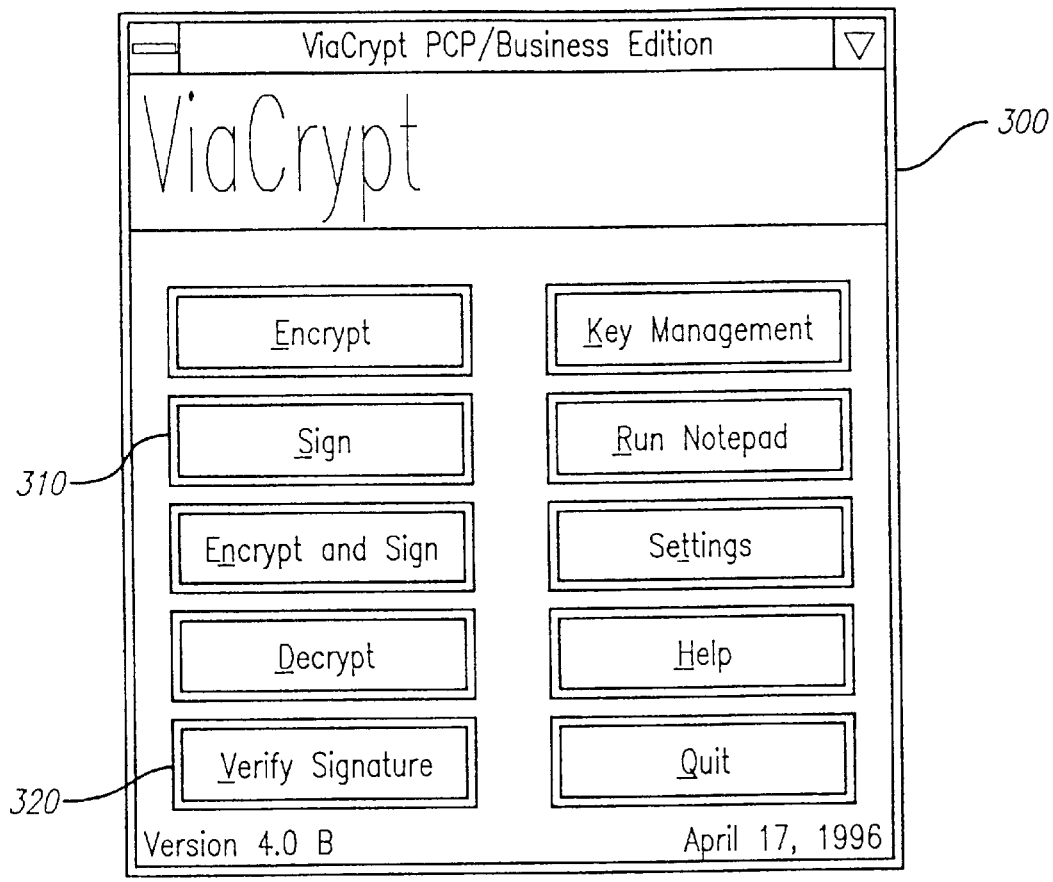
FIG. 3 is an illustration of a main menu from ViaCrypt PGP/Business Edition™ by ViaCrypt.

At block 260, client 100 digitally signs the electronic document in the presence of authenticator 130. In this embodiment, client 100 uses equipment of the authenticator, for example the authenticator's computer system, to produce the client's digital signature. To do so, the transportable media supplied by client 100, containing the electronic document to be signed and the public and private keys of client 100, is made accessible to the authenticator computer. If, for example, the transportable media consists of a floppy disk, the floppy disk is inserted in a floppy disk drive attached to the authenticator computer. Client 100 then uses encryption software on the authenticator computer to produce a digital signature and attach it to the electronic document. In one embodiment of the invention, the encryption software on the authenticator computer includes ViaCrypt PGP/Business Edition™ from ViaCrypt ("PGP/Business Edition"). FIG. 3 is an illustration of a main menu 300 from PGP/Business Edition. As shown in FIG. 3, main menu 300 contains a "Sign" menu selection 310. In this embodiment, to digitally sign an electronic document, client 100 selects "Sign" menu selection 310 from main menu 300 of PGP/Business Edition. In embodiments using other encryption software, client 100 uses the commands appropriate to the particular encryption software used.

In an embodiment using PGP/Business Edition, after client 100 selects "Sign" menu selection 310, a dialog box appears requesting selection of the file to be digitally signed. Client 100 selects the drive corresponding to the transportable media containing the electronic document to be signed, and selects the electronic document. An example electronic document 400 is shown in FIG. 4. As shown in FIG. 4, electronic document 400 consists of several lines of text 410.

After client 100 has selected the electronic document to be signed, PGP/Business Edition looks for a private "keyring" of private keys that are available. A private "keyring" is a file containing private keys in encrypted form. In this embodiment, the file on the client's transportable media containing client 100's private key constitutes such a private keyring. If the private keyring found by the PGP/Business Edition contains several keys, PGP lists the user ID's of the available private keys and prompts client 100 to select the private key to be used. If the keyring only contains a single key, PGP/Business Edition assumes that this key is the one to be used to digitally sign the electronic document.

In this embodiment, the client's private key is stored on transportable media in encrypted form. The encryption method used is secret key encryption using a client selected "pass phrase" as the source for the secret key. To create a digital signature using the client's private key the private key must be decrypted. Accordingly, after the appropriate private key to be used to digitally sign the electronic document has been identified, PGP/Business Edition prompts client 100 for the pass phrase to be used to decrypt client 100's private key so that it can be used to produce the desired digital signature. FIG. 5 illustrates a dialog box 500 presented by PGP/Business Edition requesting entry of client 100's pass phrase.

After client 100 enters the client's pass phrase for the client's private key, PGP/Business Edition decrypts the private key, generates a message digest of the electronic document, encrypts the message digest with the client's private key, and attaches the resulting digital signature to the electronic document. FIG. 6 illustrates electronic document 400 of FIG. 4 after the digital signature of client 100 has been attached. As shown in FIG. 6, the digitally signed document 600 contains a beginning of signed message indicator 610, a copy 620 of the original document 400, a beginning of digital signature indicator 630, the digital signature 640, and an end of digital signature indicator 650.

Referring to FIG. 2, after client 100 has completed digitally signing the electronic document at block 260, the authenticator verifies the client's digital signature using cryptographic software on the authenticator computer and the client's public key as supplied by client 100. In one embodiment, in which the cryptographic software on the authenticator computer includes PGP/Business Edition, the authenticator initiates verification of the client's digital signature by selecting the "Verify Signature" menu option 320 from main menu 300 shown in FIG. 3 and selecting the electronic document for which the digital signature is to be verified from a file menu. PGP/Business Edition then searches for available public keys. When PGP/Business Edition finds the corresponding public key it uses it to test the digital signature.

Figure 8:
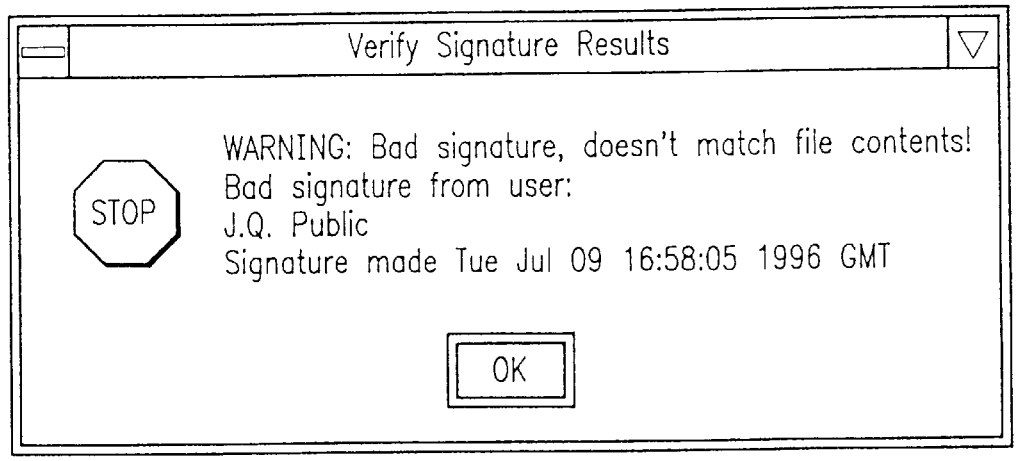
FIG. 8 illustrates an example of a dialog box used to indicate a bad digital signature in one embodiment of the present invention.

Once the proper key has been identified, the cryptographic software verifies the digital signature. The cryptographic software generates a message digest of the signed electronic document, obtains a second message digest by decrypting the digital signature using the client's public key, and compares the first and second message digests. If the two message digests are identical, the software notifies the authenticator that the digital signature is good. FIG. 7 shows an example of a dialog box 700 used by PGP/Business Edition to indicate a good digital signature. If the two message digests are not identical, the software notifies the authenticator that the digital signature is not good. FIG. 8 shows an example of a dialog box 800 used by PGP/Business Edition to indicate a bad digital signature.

Referring to FIG. 2, if the signature is found to be bad at block 267, the client re-signs the electronic document at block 269, and the verification process repeats at block 265. If the signature is found to be good at block 267, the authenticator attaches an authenticator statement to the client-signed electronic document at block 270.

An authenticator statement is a statement the authenticator generates by which the authenticator attests to having witnessed the client's digital signing of the electronic document. The exact wording of the authenticator statement may vary from one embodiment to the other, may vary according to the client's requirements, and/or may be dictated by law of the jurisdiction in which the authenticator is situated. In one embodiment of the invention, the authenticator statement is part of an "authenticator identification envelope" that is attached by the authenticator to an authenticated document. An authenticator identification envelope is a set of information that the authenticator attaches to the signed document. It includes the authenticator statement, and may include additional information. An authenticator statement may be in a human language or may be computer encoded.

In the embodiment of FIG. 2, after the authenticator attaches the authenticator statement to the signed electronic document at block 270, the authenticator at block 275 optionally attaches a copy of biometric data for the client that was obtained by the authenticator at block 250. In one embodiment, the biometric data is made part of the authenticator identification envelope.

At block 280, the authenticator digitally signs the electronic document, plus the client's digital signature, plus the information added by the authenticator. An example of a resulting, authenticated document is shown in FIG. 9.

FIG. 9 illustrates the document of FIG. 6 after it has been authenticated according to one embodiment of the present invention. In the embodiment of FIG. 9, authenticated document 900 consists of three main sections: client-signed document 600, authenticator identification envelope 910, and authenticator signature 960.

Client-signed document 600 consists of a copy of the original electronic document after it has been signed by the client, as also shown in FIG. 6.

Authenticator identification envelope 910 comprises information added by the authenticator to the electronic document according to the present invention. In the embodiment of FIG. 9, authenticator identification envelope 910 includes a beginning of authenticator identification envelope indicator 915, a beginning of authenticator statement indicator 920, an authenticator statement 925, an end of authenticator statement indicator 930, a beginning of biometric data indicator 935, biometric data 940, an end of biometric data indicator 945, and an end of authenticator identification envelope indicator 950.

Beginning of authenticator identification envelope indicator 915 is an indicator that identifies the beginning of authenticator identification envelope 910. In the embodiment of FIG. 9, beginning of authenticator identification envelope indicator 915 consists of a text string.

Beginning of authenticator statement indicator 920 is an indicator that identifies the beginning of authenticator statement 925. In the embodiment of FIG. 9, beginning of authenticator statement indicator 925 consists of a text string.

Authenticator statement 925 consists of information added by the authenticator describing particulars of the digital signature witnessed by the authenticator. In the embodiment of FIG. 9, authenticator statement 925 includes a statement 921 indicating the identity of the authenticator, data 922 indicating the date, time and place at which the authenticator witnessed the digital signing of the electronic document, and a listing 923 of the materials examined by the authenticator to establish the identity of the client. In the embodiment of FIG. 9, authenticator statement 925 also includes a statement 924 indicating that the authenticator has taken biometric readings of the client, identifying the particular type of biometric reading taken, and indicating that resulting biometric data is appended to the electronic document.

End of authenticator statement indicator 930 is an indicator that identifies the end of authenticator statement 925. In the embodiment of FIG. 9, end of authenticator statement indicator 930 consists of a text string.

Beginning of biometric data indicator 935 is an indicator that identifies the beginning of biometric data 940. In the embodiment of FIG. 9, beginning of biometric data indicator 935 consists of a text string.

Biometric data 940 consists of biometric data resulting from biometric readings made by the authenticator of the client. In FIG. 9, the biometric data is represented by several lines of digital 1's and 0's. The biometric data appended by an authenticator to a signed electronic document can take a variety of other forms.

End of biometric data indicator 945 is an indicator that identifies the end of biometric data 940. In the embodiment of FIG. 9, end of biometric data indicator 945 consists of a text string.

End of authenticator identification envelope indicator 950 is an indicator that identifies the end of authenticator identification envelope 910. In the embodiment of FIG. 9, end of authenticator identification envelope indicator 950 consists of a text string.

In the embodiment of FIG. 9, the authenticator identification envelope includes an authenticator statement and biometric data. In other embodiments, more or less information may be included in the authenticator identification envelope. For example, the authenticator identification envelope may contain an identification level identifier that specifies the degree of scrutiny of the client's identity undertaken by the authenticator. The authenticator may also include a copy of the public key presented by the client, and/or a copy of a digital certificate obtained by the client from a certification authority authenticating the public key of the client. The authenticator may also include a copy of a digital certificate obtained by the authenticator from a certification authority authenticating the public key of the authenticator. In some embodiments, information supplied by the authenticator may be appended to an electronic document without using beginning and end of authenticator identification envelope indicators such as indicators 915 and 950, respectively, to delineate a specific authenticator identification envelope. The term "authenticator identification envelope" as used herein refers to information added by an authenticator to a client-signed document, regardless of whether or not such information is labeled with the words "authenticator identification envelope" and regardless of whether or not indicators are used to identify bounds of such added information.

In this embodiment authenticator digital signature 960 includes a beginning of signed message indicator 965, digital signature indicator 961, a version indicator 962, an encrypted message digest 963, and an end of digital signature indicator 964.

Beginning of signed message indicator 965 is an indicator that identifies the beginning of the component parts that are signed by the authenticator's digital signature.

Beginning of digital signature indicator 961 is an indicator that identifies the beginning of authenticator digital signature 960. In the embodiment of FIG. 9, beginning of digital signature indicator 961 consists of a text string.

Version indicator 962 indicates the version of the software program used to produce authenticator digital signature 960.

Encrypted message digest 963 is a message digest of client-signed electronic document 600 and authenticator identification envelope 910 encrypted using the authenticator's public key. Encrypted message digest 963 constitutes the authenticator digital signature of the client's document plus the authenticator identification envelope.

End of digital signature indicator 964 is an indicator that identifies the end of authenticator digital signature 960. In the embodiment of FIG. 9, end of digital signature indicator 964 consists of a text string.

Referring to FIG. 2, after signing the electronic document at block 280, the authenticator transfers the authenticated document (such as, for example, authenticated document 900 of FIG. 9) to transportable media of the client at block 285, which may be the same transportable media on which the client brought the original electronic document to the authenticator, or may be another transportable media, such as, for example, floppy disk 170 of FIG. 1. In addition, or as an alternative, to transferring the authenticated electronic document to transportable media, the authenticator may transmit the authenticated electronic document by electronic means 150 (such as, for example, the Internet) to the office of the client or to some other recipient 160 at block 290. In one embodiment, the authenticator encrypts any such electronic document transmitted by electronic means using the public key of the recipient.

At block 295, the authenticator records transaction data concerning the authentication transaction in a transaction log. Such transaction data may include, for example, the date and time of the authentication, the name of the client, forms of identification used for client verification, and a descriptive title of the electronic document authenticated.

Figure 10:
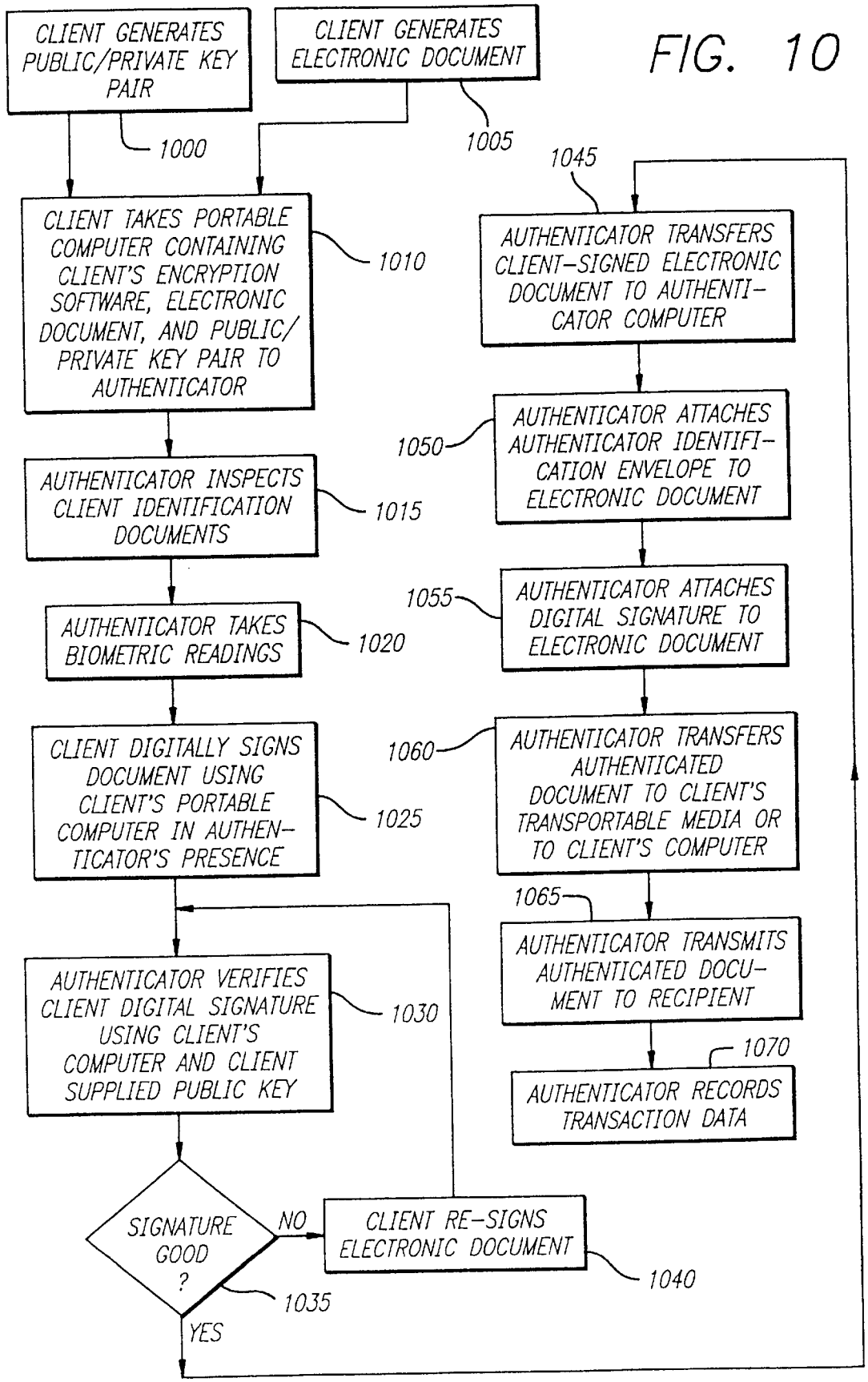
FIG. 10 is a block diagram of a process used to produce an authenticated electronic document in one embodiment of the present invention.

One example of an electronic document that an authenticator may transmit electronically to a recipient at block 290 is an application for a digital certificate. In one application of the present invention, the authenticator acts as an agent for a certification authority. A client wishing to obtain a digital certificate from the certification authority in this embodiment obtains an electronic version of the certification authority's application form (for example from the certification authority's Internet server) and fills in the requested information. The client brings the completed electronic application to the authenticator, digitally signs it in the presence of the authenticator, and the authenticator adds an authenticator identification envelope according to the present invention. In this application, the authenticator identification envelope may contain a specific form of authenticator statement as required by the certification authority. The authenticator digitally signs the application, encrypts the authenticated application with the certification authority's public key, and transmits the encrypted application to the certification authority. In the embodiment of FIG. 2, the public/private keys generated by the client and the client's encryption software are compatible with encryption software of the authenticator. FIG. 10 is a block diagram of a process used to produce an authenticated electronic document according to the present invention in an embodiment in which the encryption software of the authenticator is not compatible with the client's public and private keys or encryption software.

As shown in FIG. 10, in this embodiment, the client generates a public/private key pair at block 1000 and generates the electronic document to be authenticated at block 1005. The client takes a portable computer containing the client's encryption software, the electronic document, and the client's public/private keys to the authenticator's place of business at block 1010. The authenticator inspects the client's identification documents at block 1015, and optionally takes biometric readings of the client at block 1020. The client digitally signs the electronic document using the client's portable computer in the authenticator's presence at block 1025.

The authenticator verifies the client's digital signature using the client's encryption software and the client's public key at blocks 1030 and 1035.

If the authenticator determines that the signature is not valid, the client re-signs the electronic document at block 1040. The process then returns to block 1030.

If the authenticator determines that the signature is valid, the authenticator transfers the client-signed document to an authenticator's computer at block 1045. The authenticator may transfer the electronic document by establishing an electronic connection between the client computer and the authenticator computer and transferring the document electronically, or the authenticator may store the electronic document on transportable media and transfer the transportable media from the client computer to the authenticator computer.

The authenticator uses the authenticator computer to attach an authenticator identification envelope of the present invention to the electronic document at block 1050. The authenticator identification envelope may contain additional information, such as an authenticator statement indicating that the authenticator verified the client's digital signature using client supplied computer and software. The authenticator digitally signs the electronic document at block 1055. The authenticator transfers the authenticated document to the client's portable computer or transportable media at block 1060, and/or transmits the authenticated document to a recipient in electronic form at block 1065. The authenticator records pertinent transaction data in the authenticator's transaction log at block 1070.

Figure 11:
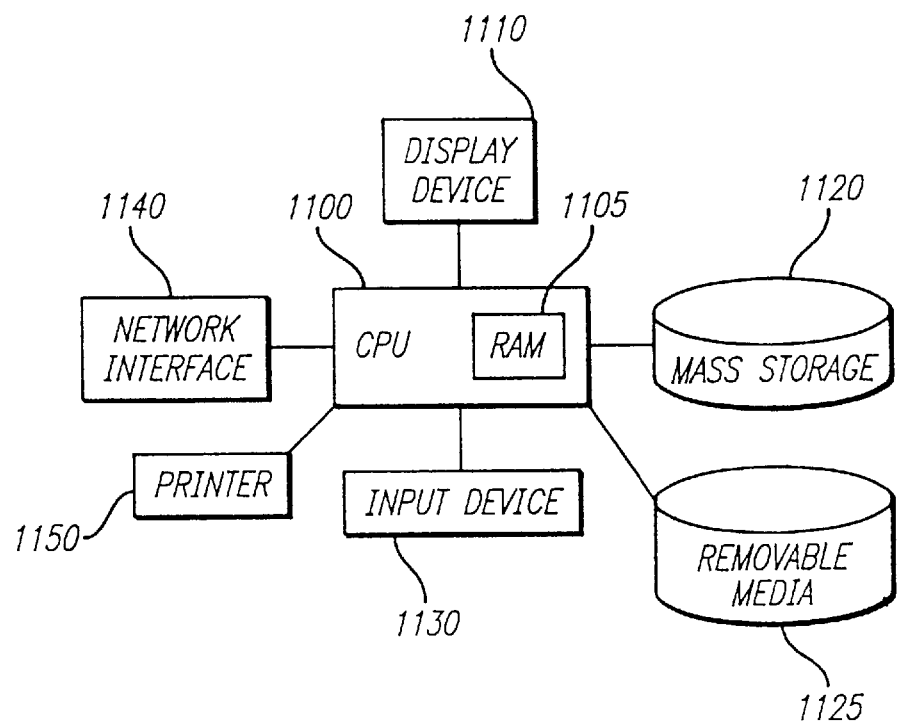
FIG. 11 is a schematic diagram of an example of a computer system that may be used as a client computer or an authenticator computer of the present invention.

FIG. 11 is a schematic diagram of a computer system that may be used as a client computer or an authenticator computer of the present invention. The computer system shown in FIG. 11 includes a CPU unit 1100 that includes a central processor, main RAM memory 1105, peripheral interfaces, input-output devices, power supply, and associated circuitry and devices; a display device 1110 which may be a cathode ray tube display, LCD display, gas-plasma display, or any other computer display; an input device 1130, which may include a keyboard, mouse, digitizer, or other input device; non-volatile storage 1120, which may include magnetic, re-writable optical, or other mass storage devices; a transportable media drive 1125, which may include magnetic, re-writable optical, or other removable, transportable media, and a printer 1150. The computer system may also include a network interface 1140, which may include a modem, allowing the computer system to communicate with other systems over a communications network such as the Internet. Any of a variety of other configurations of computer systems may also be used. In one embodiment, the authenticator computer comprises an Intel Pentium™ CPU and runs the Microsoft Windows 95™ operating environment.

Thus, an improved method and apparatus for authentication of electronic documents has been described. Although the present invention has been described with respect to certain example embodiments, it will be apparent to those skilled in the art that the present invention is not limited to these specific embodiments. Further, although the operation of certain embodiments has been described in detail using specific software programs and certain detailed process steps, different software may be used, and some of the steps may be omitted or other similar steps may be substituted, without departing from the scope of the invention. Other embodiments incorporating the inventive features of the present invention will be apparent to those skilled in the art.

We claim:

1. A method for authenticating an electronic document comprising the steps of:

generating a first digital signature of an originating party for said electronic document;

generating an identification envelope comprising a verifying statement for said electronic document, said verifying statement comprising a statement of a verifying party indicating that said verifying party witnessed execution of said first digital signature by said originating party;

generating a second digital signature of said verifying party for said electronic document and for said identification envelope.

2. The method of claim 1 further comprising the step of verifying said first digital signature prior to generating said identification envelope for said electronic document.

3. The method of claim 1 wherein said identification envelope comprises biometric data of said originating party.

4. The method of claim 3 wherein said biometric data comprises a digitized fingerprint of said originating party.

5. The method of claim 1 wherein said identification envelope comprises a public key of said originating party.

6. The method of claim 1 wherein said identification envelope comprises a digital certificate of said originating party.

7. The method of claim 1 wherein said identification envelope comprises a digital certificate of said verifying party.

8. The method of claim 1 further comprising the step of appending indicators to said electronic document for delineating said identification envelope.

9. The method of claim 1 wherein said identification envelope comprises information identifying materials used by said verifying party to verify the identity of said originating party.

10. The method of claim 1 wherein said identification envelope is computer encoded.

11. A program storage device readable by a machine, tangibly embodying a program of instructions executable by the machine to perform a method for authenticating an electronic document, said method comprising the steps of:

generating a first digital signature of an originating party for said electronic document;

generating an identification envelope comprising a verifying statement for said electronic document, said verifying statement comprising a statement of a verifying party indicating that said verifying party witnessed execution of said first digital signature by said originating party;

generating a second digital signature of said verifying party for said electronic document and for said identification envelope.

12. The program storage device of claim 11 wherein said method further comprises the step of verifying said first digital signature prior to generating said identification envelope for said electronic document.

13. The program storage device of claim 11 wherein said identification envelope comprises biometric data of said originating party.

14. The program storage device of claim 13 wherein said biometric data comprises a digitized fingerprint of said originating party.

15. The program storage device of claim 11 wherein said identification envelope comprises a public key of said originating party.

16. The program storage device of claim 11 wherein said identification envelope comprises a digital certificate of said originating party.

17. The program storage device of claim 11 wherein said identification envelope comprises a digital certificate of said verifying party.

18. The program storage device of claim 11 wherein said method further comprises the step of appending indicators to said electronic document for delineating said identification envelope.

19. The program storage device of claim 11 wherein said identification envelope comprises information identifying materials used by said verifying party to verify the identity of said originating party.

20. The program storage device of claim 11 wherein said identification envelope is computer encoded.

* * * * *